(12) United States Patent
Shivaji-Rao

(10) Patent No.: US 8,589,523 B2
(45) Date of Patent: Nov. 19, 2013

(54) PERSONALIZED ASSISTANCE WITH SETUP OF A MEDIA-PLAYING SET

(75) Inventor: Vishnu Kumar Shivaji-Rao, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1591 days.

(21) Appl. No.: 11/501,366

(22) Filed: Aug. 8, 2006

(65) Prior Publication Data

US 2008/0046916 A1 Feb. 21, 2008

(51) Int. Cl.
*G06F 15/177* (2006.01)

(52) U.S. Cl.
USPC .......................... 709/221; 709/220; 709/223

(58) Field of Classification Search
USPC .................................................. 709/221, 220
See application file for complete search history.

(56) References Cited

U.S. PATENT DOCUMENTS

| | | | |
|---|---|---|---|
| 4,264,925 A | 4/1981 | Freeman et al. |
| 4,967,337 A | 10/1990 | English et al. |
| 5,220,496 A | 6/1993 | Tanaka et al. |
| 5,235,414 A | 8/1993 | Cohen |
| 5,278,565 A | 1/1994 | Horn |
| 5,353,238 A | 10/1994 | Neef et al. |
| 5,488,427 A | 1/1996 | Kayashima et al. |
| 5,504,896 A | 4/1996 | Schell et al. |
| 5,534,911 A | 7/1996 | Levitan |
| 5,754,940 A | 5/1998 | Smith et al. |
| 5,799,311 A | 8/1998 | Agrawal et al. |
| 5,815,662 A | 9/1998 | Ong |
| 5,850,340 A | 12/1998 | York |
| 5,936,611 A | 8/1999 | Yoshida |
| 5,956,487 A | 9/1999 | Venkatraman et al. |
| 6,005,597 A | 12/1999 | Barrett et al. |
| 6,006,265 A | 12/1999 | Rangan et al. |
| 6,008,836 A | 12/1999 | Bruck et al. |
| 6,166,778 A | 12/2000 | Yamamoto et al. |
| 6,195,616 B1 | 2/2001 | Reed et al. |
| 6,202,210 B1 | 3/2001 | Ludtke |
| 6,233,611 B1 | 5/2001 | Ludtke et al. |
| 6,343,261 B1 | 1/2002 | Iwanowski et al. |
| 6,351,561 B1 | 2/2002 | Iyengar |
| 6,377,858 B1 | 4/2002 | Koeppe |
| 6,393,373 B1 | 5/2002 | Duyar et al. |

(Continued)

FOREIGN PATENT DOCUMENTS

| | | |
|---|---|---|
| EP | 0 798 921 | 10/1997 |
| EP | 0 844 788 | 5/1998 |

(Continued)

*Primary Examiner* — Philip B Tran
(74) *Attorney, Agent, or Firm* — Chernoff Vilhauer McClung & Stenzel, LLP

(57) ABSTRACT

A system and corresponding method for providing personalized assistance to users with setup of their respective media-playing sets provides a computing device remote from each set hosting a web page interface for prompting each user to create an individual account and to submit personal setup information for entry into this account; a script generator generates a personalized script for each set based on the personal setup information entered into the individual account of the corresponding user; this personalized script, by being activated, configures the corresponding set including by automatically making personalized setup selections from a plurality of preexisting setup alternatives supported by the corresponding set. These preexisting setup alternatives, for example, typically are described in a user manual accompanying or available for the set and, absent the present system and method, typically require difficult manual configuration to implement.

22 Claims, 11 Drawing Sheets

(56) References Cited

U.S. PATENT DOCUMENTS

| | | |
|---|---|---|
| 6,425,128 B1 | 7/2002 | Krapf et al. |
| 6,430,526 B1 | 8/2002 | Toll |
| 6,438,752 B1 | 8/2002 | McClard |
| 6,505,243 B1 | 1/2003 | Lortz |
| 6,507,762 B1 | 1/2003 | Amro et al. |
| 6,542,163 B2 | 4/2003 | Gorbet et al. |
| 6,556,960 B1 | 4/2003 | Bishop et al. |
| 6,614,187 B1 | 9/2003 | Kanzaki et al. |
| 6,614,987 B1 | 9/2003 | Ismail et al. |
| 6,633,235 B1 | 10/2003 | Hsu et al. |
| 6,725,102 B2 | 4/2004 | Sun |
| 6,727,914 B1 | 4/2004 | Gutta |
| 6,756,997 B1 | 6/2004 | Ward, III et al. |
| 6,766,283 B1 | 7/2004 | Goldman et al. |
| 6,772,096 B2 | 8/2004 | Murakami et al. |
| 6,782,495 B2 | 8/2004 | Bernklau-Halvor |
| 6,789,081 B1 | 9/2004 | Vanska |
| 6,795,011 B1 | 9/2004 | Berthoud et al. |
| 6,813,775 B1 | 11/2004 | Finseth et al. |
| 6,819,364 B2 | 11/2004 | Creed et al. |
| 6,842,776 B1 | 1/2005 | Poisner |
| 6,851,090 B1 | 2/2005 | Gutta et al. |
| 6,868,292 B2 | 3/2005 | Ficco et al. |
| 6,879,350 B2 | 4/2005 | Kwon et al. |
| 6,879,973 B2 | 4/2005 | Skaaning et al. |
| 6,907,545 B2 | 6/2005 | Ramadei et al. |
| 6,915,308 B1 | 7/2005 | Evans et al. |
| 6,917,819 B2 | 7/2005 | Collins |
| 6,922,482 B1 | 7/2005 | Porath |
| 6,922,680 B2 | 7/2005 | Buczak |
| 6,934,713 B2 | 8/2005 | Schwartz et al. |
| 6,947,156 B1 | 9/2005 | Jeyachandran et al. |
| 6,947,935 B1 | 9/2005 | Horvitz et al. |
| 6,947,966 B1 | 9/2005 | Oko, Jr. et al. |
| 6,951,031 B2 | 9/2005 | Hatano |
| 6,954,678 B1 | 10/2005 | Phan et al. |
| 6,954,689 B2 | 10/2005 | Hanson et al. |
| 6,957,202 B2 | 10/2005 | Skaaning et al. |
| 7,113,181 B2 | 9/2006 | Tey et al. |
| 7,356,575 B1 * | 4/2008 | Shapiro ............ 709/220 |
| 7,480,703 B2 * | 1/2009 | Shapiro ............ 709/220 |
| 7,512,882 B2 * | 3/2009 | Fong et al. ........ 715/716 |
| 7,565,672 B2 * | 7/2009 | Yun ................... 725/46 |
| 7,647,386 B2 * | 1/2010 | Shapiro ............ 709/217 |
| 7,673,083 B2 * | 3/2010 | Laefer et al. ...... 710/105 |
| 7,730,165 B2 * | 6/2010 | Shapiro ............ 709/220 |
| 7,752,265 B2 * | 7/2010 | Svendsen et al. .... 709/205 |
| 7,787,904 B2 * | 8/2010 | Issa .................. 455/556.1 |
| 7,890,874 B2 * | 2/2011 | Kaufman ............ 715/751 |
| 2002/0003903 A1 | 1/2002 | Engeldrum et al. |
| 2002/0010589 A1 | 1/2002 | Nashida et al. |
| 2002/0116539 A1 | 8/2002 | Bryczkowski et al. |
| 2002/0140728 A1 | 10/2002 | Zimmerman |
| 2003/0046303 A1 | 3/2003 | Chen et al. |
| 2003/0061212 A1 | 3/2003 | Smith et al. |
| 2003/0084448 A1 | 5/2003 | Soundararajan |
| 2003/0084449 A1 | 5/2003 | Chane et al. |
| 2003/0110412 A1 | 6/2003 | Neville |
| 2003/0110413 A1 | 6/2003 | Bernklau-Halvor |
| 2003/0111754 A1 | 6/2003 | Hinzpeter et al. |
| 2004/0051816 A1 | 3/2004 | Ikeguchi |
| 2004/0070628 A1 | 4/2004 | Iten et al. |
| 2004/0078809 A1 | 4/2004 | Drazin |
| 2004/0143403 A1 | 7/2004 | Brandon et al. |
| 2004/0145371 A1 | 7/2004 | Bertness et al. |
| 2004/0153773 A1 | 8/2004 | Woo et al. |
| 2004/0176966 A1 | 9/2004 | Chen |
| 2004/0187168 A1 | 9/2004 | Shintani et al. |
| 2004/0207764 A1 | 10/2004 | Naoi et al. |
| 2005/0066241 A1 | 3/2005 | Gross et al. |
| 2005/0081410 A1 | 4/2005 | Furem et al. |
| 2005/0085973 A1 | 4/2005 | Furem et al. |
| 2005/0097070 A1 | 5/2005 | Enis et al. |
| 2005/0097507 A1 | 5/2005 | White et al. |
| 2005/0141542 A1 | 6/2005 | Handekyn et al. |
| 2005/0149980 A1 | 7/2005 | Yun |
| 2005/0159922 A1 | 7/2005 | Hsiung et al. |
| 2005/0159996 A1 | 7/2005 | Lazarus et al. |
| 2005/0235319 A1 | 10/2005 | Carpenter et al. |
| 2006/0031400 A1 | 2/2006 | Yuh et al. |
| 2006/0212479 A1 | 9/2006 | Habas et al. |

FOREIGN PATENT DOCUMENTS

| | | |
|---|---|---|
| EP | 1 176 503 | 1/2002 |
| EP | 1 517 259 | 3/2005 |
| GB | 2 354 902 | 4/2001 |
| WO | WO 01/33858 | 5/2001 |
| WO | WO 03/044684 | 5/2003 |
| WO | WO 2004/044789 | 5/2004 |
| WO | WO 2004/057473 | 7/2004 |
| WO | WO 2004/095456 | 11/2004 |

* cited by examiner

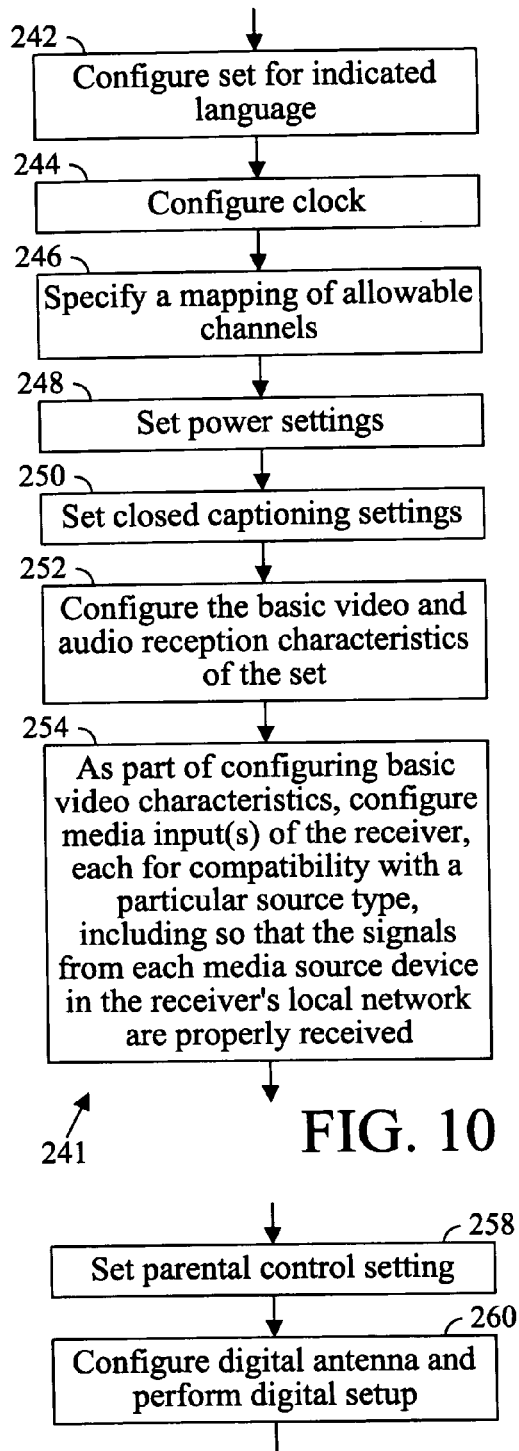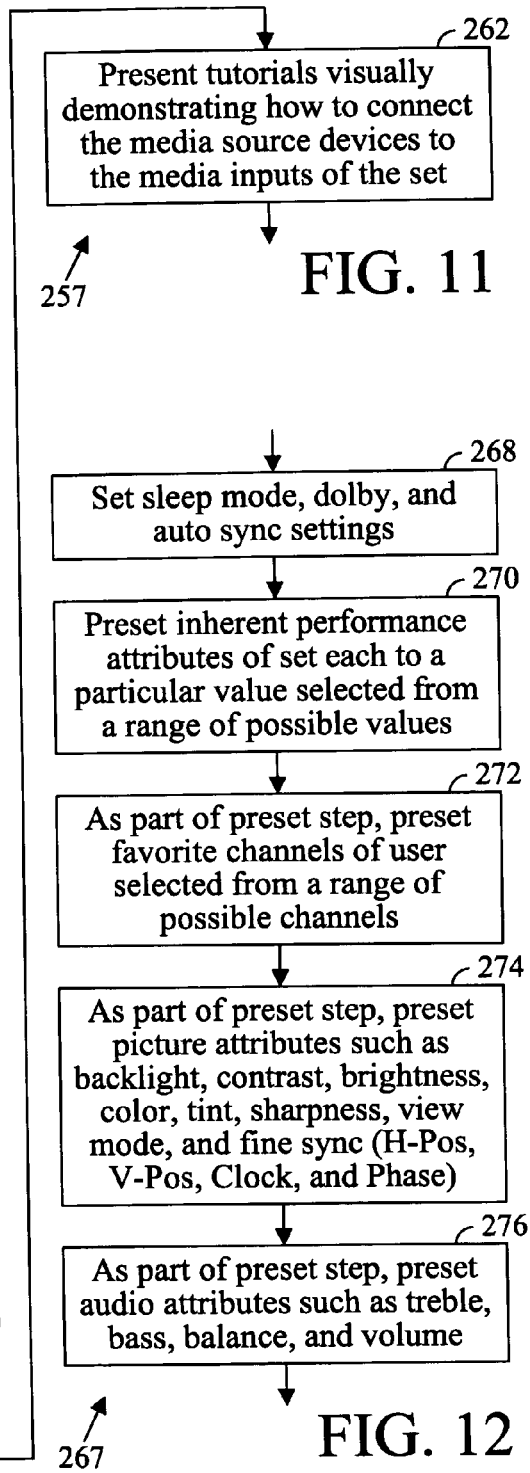

PERSONALIZED ASSISTANCE WITH SETUP OF A MEDIA-PLAYING SET

CROSS-REFERENCE TO RELATED APPLICATIONS

Not applicable.

BACKGROUND OF THE INVENTION

The present invention relates to a system and method of setup of a media-playing set and relates, in particular, to a system and method for providing personalized assistance to geographically distributed users with setup of their respective media-playing sets.

As technology has progressed, media-playing sets have become ever more versatile in terms of configuration, signal reception, functions provided, and compatibility with related peripherals. For example, one type of media-playing set, the television, was originally designed as a standalone unit receiving a handful of air broadcast channels and having a few basic controls, such as a channel selector and an on/off knob turnable for volume adjustment. In contrast, a modern television set can typically process signals from a variety of peripherals, such as a personal computer, videocassette recorder, digital video disc recorder, compact disc player, or stereo, and can accept signals from a variety of external sources, including air broadcast, cable, and satellite. The number of channels or programs received can number into the hundreds. Also, an on-screen control menu is typically employed for adjusting different aspects of the picture, sound, and other operational features so that these features can be better adapted to the various media and program formats available. Moreover, hybrid forms have appeared including televisions able to process digitized signals, such as in MPEG-2 or -4 format, and computers or miniplayers able to process television or other media broadcasts via a tuner card or through upstream conversion of the media signal to digitized format.

Because of the many options available in configuring a modern media-playing set, users can encounter difficulties while performing setup tasks such as connecting peripherals, programming the remote, configuring the set to receive the desired channels, adjusting picture and sound, subscribing to commercial services, and so on. Providing the user with a clear instruction manual is a significant help; however, the user may lose or misplace the manual or simply not have the time or patience to read through the entire manual in order to find the section that pertains to the user's question. To provide users another avenue for obtaining help, many manufacturers contract with or maintain call centers where users can call in and address their questions to a live customer service representative. However, as the duration and volume of calls increases, costs for staffing the call center can increase significantly, so it is desirable that another help option be available for guiding the user through procedures connected with routine setup. Moreover, because the customer service staff is under pressure to complete each call in the minimum amount of time, the user may have to call more than once to obtain the information needed to personalize setup to any significant extent. This is particularly so where efficient communication between the user and customer service representative is hampered by educational or language barriers.

Accordingly, certain objects of the present invention include providing a system and method for providing personalized assistance to users with setup of their respective media-playing sets in a manner that is more efficient, more convenient, more effective, and less expensive than previously available.

BRIEF SUMMARY OF THE INVENTION

In accordance with a first aspect of the present invention, a system is provided for giving personalized assistance to users with setup of their respective media-playing sets comprising a computing device remote from each set hosting a web page interface enabling each user to create an individual account and to submit personal setup information for entry into this individual account; this computing device including a script generator to generate a personalized script for each set based on the personal setup information entered into the individual account of the corresponding user; and each personalized script configuring the corresponding set upon being activated and including a code sequence for automatically making personalized setup selections from a plurality of preexisting setup alternatives supported by the corresponding set.

This first aspect enables a network of users who are remotely distributed geographically to submit their individual information, preferably securely, to a remote host site where powerful computing resources are concentrated. The web page format enables this information to be efficiently collected in a manner that is easy-to-use and familiar to most users without the level of communication difficulties often found with data collection by telephone. The personalized script generated by the script generator allows a setup solution to be efficiently developed and implemented based on each user's individual information and preferences. Implementation of a personalized solution proceeds subject to the script in an ordered manner and specifically addresses those preexisting setup alternatives that the user would otherwise need to manually configure on their own. In particular, this system permits each user to configure their set while avoiding any need to hunt through the manual for relevant setup procedures and without recourse to telephone support as can cause extra expense for the manufacturer and frustration for the user.

In accordance with a second aspect of the present invention, a method is provided for giving personalized assistance to users with setup of their respective media-playing sets comprising providing a web page interface on a computing device remote from each set and prompting each user via said web interface to create an individual account and to submit personal setup information for entry into said individual account; providing a script generator on the computing device and generating with this script generator a personalized script for each set based on the personal setup information entered into the individual account of the corresponding user; and, by activating each personalized script, configuring the corresponding set based on the personal setup information submitted by the corresponding user including automatically making personalized setup selections from a plurality of preexisting setup alternatives supported by the corresponding set.

This second aspect enables each user to configure their set in accordance with an efficient, economic, easy-to-follow, and well-structured procedure that, at the same time, permits each user's preferences to be individually taken into account. In particular, this procedure allows the user to make personalized setup selections from the full range of preexisting setup alternatives supported by their particular set, which alternatives the user might otherwise have difficulty implementing without excessive frustration or costly external assistance.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 10 shows further details of the preliminary setup operation shown in FIG. 9.

FIG. 11 shows further details of the advanced setup operation shown in FIG. 9.

FIG. 12 shows further details of the personalization setup operation depicted in FIG. 9.

DETAILED DESCRIPTION OF PREFERRED EMBODIMENT

Figure 1:
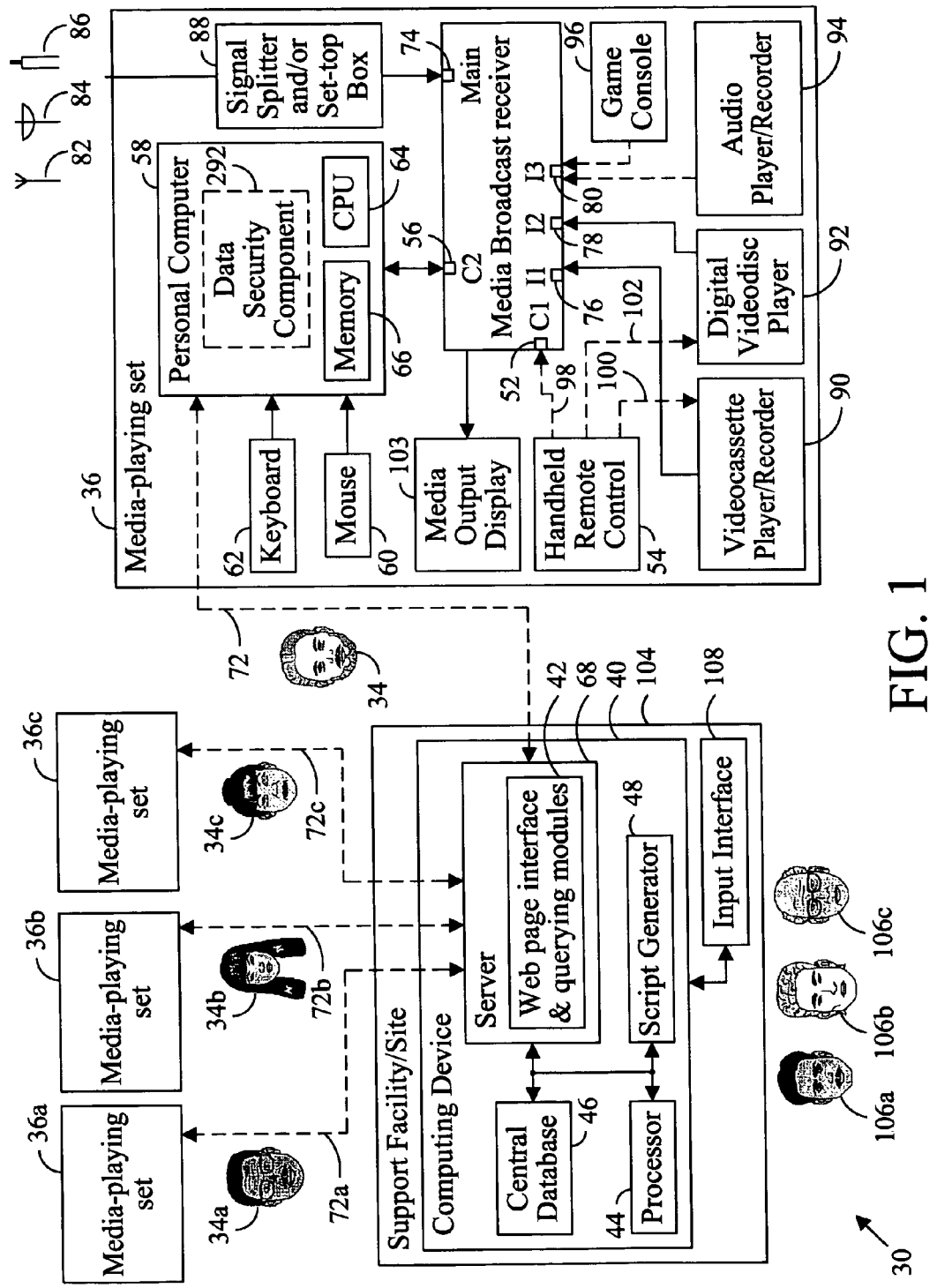
FIG. 1 is a diagrammatic view of an exemplary system for providing personalized assistance to users with setup of their respective media-playing sets as constructed in accordance with the present invention.

FIG. 1 shows an exemplary system 30 for providing personalized assistance to users with setup of their respective media-playing sets. In the figure, the users are denoted by reference numbers 34 and 34 *a, b,* and *c*, and their respective media-playing sets are correspondingly denoted by numbers 36 and 36 *a, b,* and *c*. The system 30 includes a computing device 40 physically located remotely from each set to which each set is electronically connectible. The term "remotely" is intended here to signify that the computing device is inaccessible to any user from their home or other quarters. This allows, for example, the personal data collected from each user to be better protected by on-staff administrators against security breaches by other users or outside parties. This personal data, which includes user preferences regarding setup, is collected by the main computer by a web page interface module 42. This module prompts each user to create an individual account and to submit personal setup information for entry into this account. The computing device includes a processor 44 and central database 46, which processor assigns the data in each account to an addressable memory region of the database for later recall and use.

After the personal setup information of a particular user has been collected, preferably during a single session, a script generator 48 included in the computing device 40 generates a personalized script that is specifically based on this information and adapted for the corresponding set. Upon being downloaded and activated, this script configures the corresponding set and, in particular, includes a code sequence for automatically making personalized setup selections from a plurality of preexisting setup alternatives supported by that type of set. Hence in FIG. 10, which shows a detailed sequence of operations performed by an exemplary script during its preliminary setup cycle, the first step involves configuring the set for the indicated language, it being understood here that the corresponding set supports different languages (e.g., English, French, and Spanish) and that the user earlier, in their personal setup information, indicated their preference for one of these languages (such as English). This automatic configuration of the preexisting setup alternatives supported by the particular set saves the user the trouble of manually configuring the set. In particular, it saves the user the trouble of searching through the manual for each particular setup procedure relevant to their situation or of trying to work through an established but detailed setup sequence while on the telephone with a customer service representative.

It will be recognized, from the above, that the present system affords particular advantage where the subject set offers a host of setup alternatives to choose between, that is, where the set is of an advanced, full-featured design. A representative set 36 of this type is depicted in FIG. 1. At the heart of this set is a media broadcast receiver 50, such as a modern digital television, providing a variety of different inputs for receiving a corresponding variety of different signals, including control signals, internal media signals from associated peripherals, and external media signals from external sources.

The media broadcast receiver 50 has a first control input 52 (C1) for receiving commands conveyed by infrared or wireless transmission from a handheld remote control 54 and a second control input 56 (C2) for receiving commands from and returning data to a personal computer 58. These control devices are manually manipulable by the user for unassisted setup and operation of the set, that is the user can operate the keypad on the remote or interact with a control menu screen on the computer's display using the mouse 60 and keyboard 62.

The personal computer 58 serves as the lead device in the local network defined by the receiver 50 and its peripherals insofar as the computer's central processing unit (CPU) 64 and memory 66 enable it to interact effectively with the remote computing device 40. A server 68 included on the device 40 preferably includes both a querying module and the above described web page interface module (both numbered under item 42). The local computer 58 responds to status queries made by this querying module about the receiver's internal attributes by interrogating the receiver 50 and then uploading the status information requested. Also, the local computer is able to translate the personalized script downloaded from the remote device into a sequence of control signals suitable for processing by the receiver.

To enable uploading and downloading operations, a connection to the remote device 40 is preferably initiated locally, as by dial-up operation, from the personal computer 58 over temporary network lines 72 and 72 a, b, and c. These lines are provided, for example, using conventional telephone and digital subscriber line (DSL) technology. Preferably a secure and readily recognizable communications standard is employed, such as one based on secure sockets layer (SSL) and extensible markup language (XML) protocols. It may be noted that although the personal computer 58 and receiver 50 have been identified in FIG. 1 as separate devices for ease of description, their functions can be combined in a single device. Thus the receiver could integrally contain the required computing elements, or the computer, with the addition of a suitable video tuning card, could integrally provide the functions of the media receiver.

The media broadcast receiver 50 includes a "Main" media input 74 and a plurality of "peripheral" media inputs 76 (I1), 78 (I2), and 80 (I3). In the particular setup depicted in FIG. 1, the main input 74 is connected to an external media source, such as by an air antenna 82, cable link 84, or satellite dish 86. This external signal is fed to the main input through a signal splitter and/or set-top box 88. The other output of the splitter (not shown) typically connects to an input of one of the peripherals, such as the videocassette player/recorder 90, with any decoding of premium programming performed by the set-top box, if needed. Peripheral inputs 76 and 78 receive the media playback outputs of the videocassette player/recorder 90 and digital videodisc player 92, respectively. In general, a single input of the receiver, upon being properly configured, may be adapted to accept media signals from a variety of source types. This is emphasized with input 80, which shows connection to either an audioplayer/recorder 94 (e.g., using left/right audio jacks) or to a game console 96 (e.g., using an S-video cable). (Input 80 is comprised of four discrete connectors: one plug for composite video, two plugs for left/right audio, and one port for S-video.) It may be noted that the handheld remote control 54 is manually operable by the user to control not only the receiver 50 but also certain of the peripherals 90 and 92, as suggested by the alternate paths 98, 100, and 102 of the remote's output transmission as indicated in dashed-line view. The visual output of the receiver is presented on a media output display or screen 103 which, for the sake of convenience in description, is shown separate from the receiver, although typically such display or screen is integrated with the receiver. The receiver also includes an audio output device, such as a pair of side-mounted speakers (not shown).

A full-featured media-playing set 36 has now been described in connection with the exemplary system 30 shown in FIG. 1. This permits a description of the present system and method in a context that fully reveals the advantages of such system and method, which description follows. It will be recognized, however, that the system is also operable, though perhaps not with the same extent of benefit, where the media-entertainment system or set takes a simpler, unitary form, such as a palm-held, web-enabled personal digital assistant (PDA).

As FIG. 1 shows, the remote computing device 40 can be part of a larger support facility or site 104. Such a facility is staffed by customer service representatives 106 a, b, and c, available to field telephone inquiries from users. These representatives preferably can interact with the computing device through an input interface 108 to take advantage, for example, of the device's remote querying function. Because the computing device is available for helping users with configuration of their set, the customer service representatives are afforded more time to handle less routine calls, such as involve troubleshooting. Preferably the site is also staffed by computer administrators charged with maintaining the performance and security of the computing device as well as any later upgrading.

Figure 2:
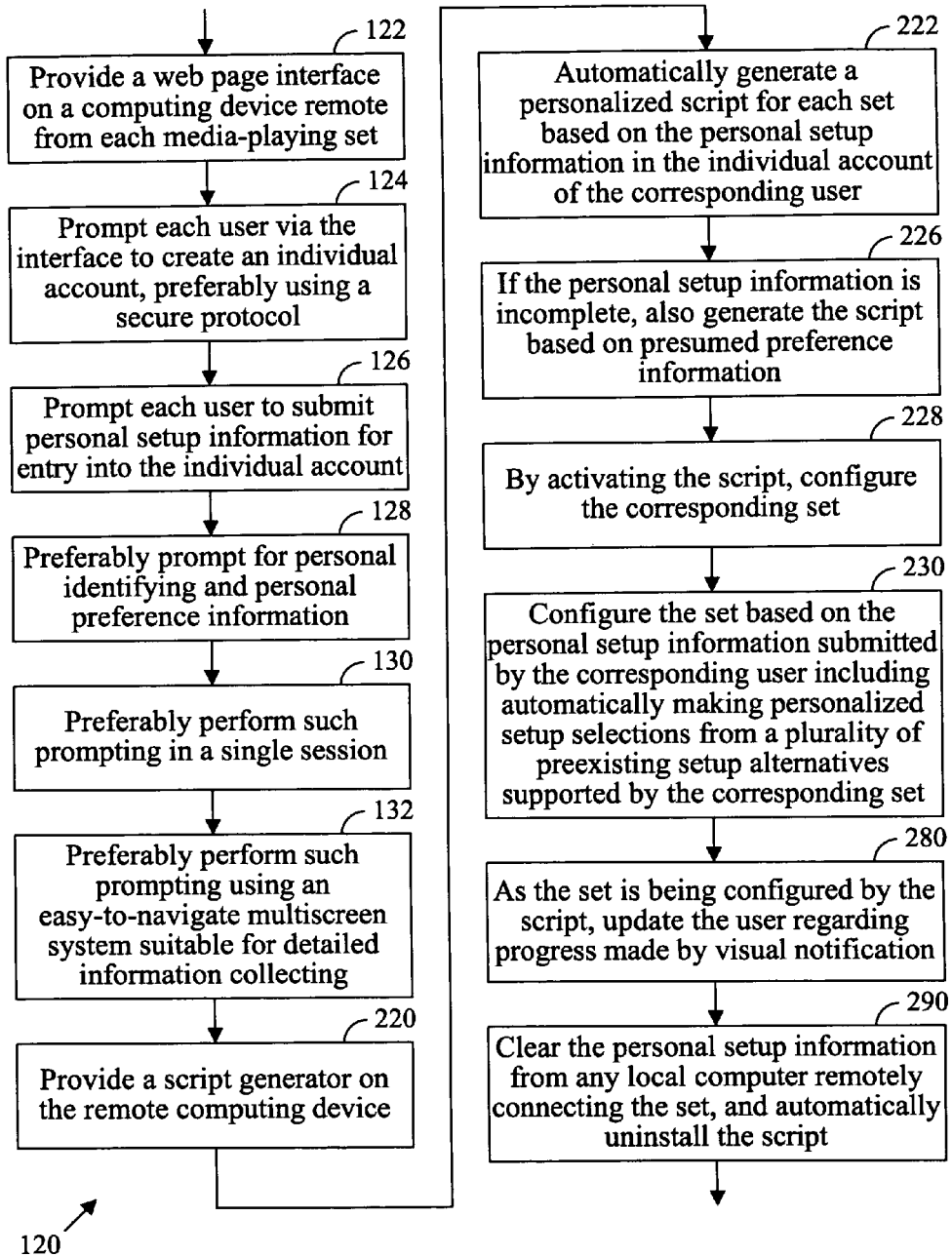
FIG. 2 is a flowchart of an exemplary method for providing personalized assistance to users with setup of their respective media-playing sets as practiced in accordance with the present invention.

An exemplary method 120 for operating a system of the type shown in FIG. 1 is depicted in FIG. 2. This method proceeds in three main stages. In broad outline, these comprise: 1) collecting personal data from each user; 2) generating a personalized script based on such data; and 3) activating this script in order to configure the set including by automatically making personalized setup selections from preexisting setup alternatives supported by the particular set.

Concerning the first stage of the exemplary method 120, which relates to collecting personal data from each user, the first step 122 involves providing a web page interface on a computing device remote from each media-playing set. In FIG. 1, it will be noted that the server 68 of the remote computing device 40 hosts a web page, that is, it includes a module or application typically implemented in software that provides a web page interface 42. The web page format provides a mode of collecting data that is familiar and easy-to-use for most users. When organized in accordance with a preferred design further described below, this format is also suitable for in-depth information collection. Such a format has significant advantages over, for example, collecting user data by telephone. In particular, the format's textual quality eliminates oral transmission difficulties due to accents, misheard statements, inattentive listening, and limited word retention; the format's support for automation supports 24 hour availability, eliminates time pressures on users and support staff, and lowers staffing costs; and the format's ordered structure makes it less likely that important data will be overlooked. Moreover, by collecting each user's personal data at a site remote from each set, the privacy of such data can be better secured against unauthorized eavesdropping or snooping by other users or third parties.

The next step 124 of the exemplary method involves prompting each user via the web page interface to create an individual account, preferably using a secure protocol. Each individual account is assigned its own addressable memory space by processor 44 within the central database 46. As part of setting up the account, the user is prompted for a password. This password serves to positively identify the user if, for example, the user later wishes to sign back onto the account in order to modify data, to repeat the configuration process, or to recover from a communication failure between the set and computing device. As described earlier, preferably communications between the set and the computing device are made using a secure protocol, that is, the user's personal data is protected not only after it has reached the remote device, as suggested by the step above, but also while in transmission. As described above, such transmission can occur over temporary network lines 72, 72 a, b, and c with reliance on conventional telephone and DSL technology with a modern network language, such as XML, and a secure protocol, such as secure sockets layer (SSL), also being used.

Step 126 involves prompting each user to submit personal setup information for entry into their individual account. It may be emphasized, here, that the information obtained is "personal" to each user and will vary from user-to-user. As the next step 139 makes clear, the personal setup information that the user is being prompted for preferably includes personal identifying and personal preference information. "Identifying" information is of a type that helps identify the user and preferably includes the user's name, the user's geographical location or zip code, and general information about the user's local network, such as the serial number or model of the broadcast receiver 50 and any firewall through which the user is connecting. "Preference" information, which typically constitutes the bulk of information collected, relates to the specific features the user prefers or wishes to implement in configuring their set. This preferably includes, for example, the language (e.g., English, French, or Spanish) to be used for operating the set, the types of external source devices to be connected to the set (e.g., via air antenna, cable, or satellite), the types of peripheral devices to be connected in the set's internal network, and the particular settings of various other possible options, such as video, audio, power setting, closed captioning, parental control, remote control mapping, personalization, or external network subscriptions.

From the above, it will be clear that a host of information is preferably requested from each user regarding their personal preferences. Notwithstanding the sizable amount of information requested, step 130 involves preferably performing such requesting or prompting in a single session. Rather than requiring the user to configure the set in a piecemeal fashion over multiple sessions separated by lesser or greater lapses of time, which approach could lead to redundant and possibly inconsistent data, preferably data collection occurs in a consolidated manner. All the information required to configure the set is collected in a single session or, more specifically, only one session is used to collect the data required each time the user desires to reconfigure the set, such as by adding or changing the peripheral devices. Although the large amount of data concerned would seem to make such a procedure impractical, this apparent difficulty is overcome in the next step of the preferred method.

Step 132 of the exemplary method involves prompting the user for personal setup information using an easy-to-navigate, multiscreen system suitable for detailed information collection. Before passing on to a description of the second stage of the exemplary method, an exemplary data collection procedure of the type summarized in step 132 will now be described, in detail, with reference to FIGS. 3-8.

Figure 3:
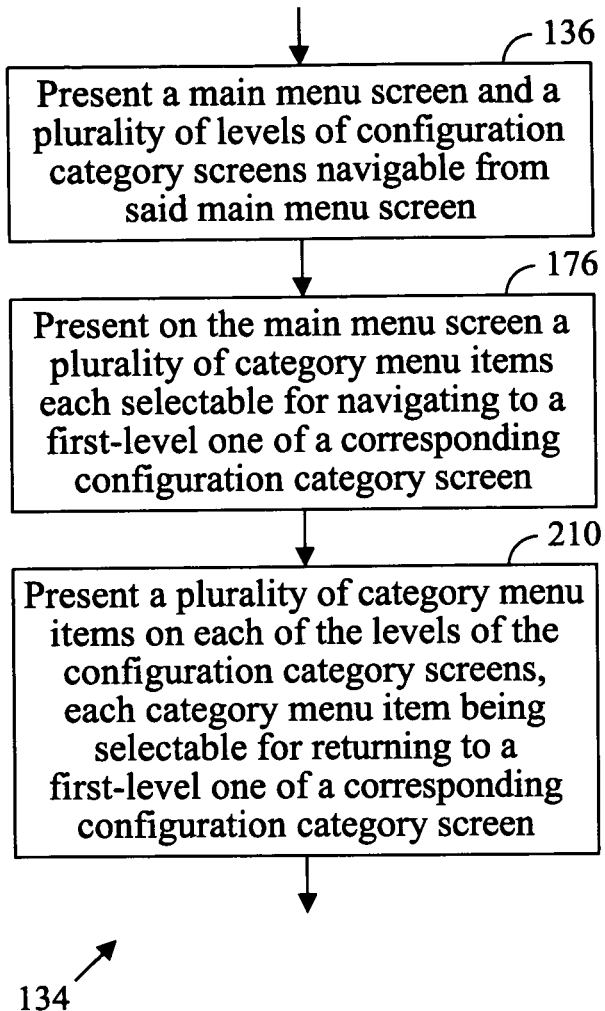
FIG. 3 is a flowchart showing details of an exemplary procedure for prompting a user for information using a multiscreen system as specified in the method of FIG. 2.

The flowchart of FIG. 3 shows details of an exemplary procedure 134 for prompting a user for information using an easy-to-navigate, multiscreen system. The first step 136 involves presenting a main menu screen and a plurality of levels of configuration category screens navigable from this main menu screen. Thus in FIG. 4, which shows a screenshot 138 presented to the user in accordance with this step, a main menu 140 is presented. From this main menu, the user can navigate to further configuration category screens such as the "Setup" screen 142 in FIG. 5, the "Remote Control" screen 144 in FIG. 6, or the "Input Source" screen 146 in FIG. 7. This can be done by using the mouse device 60 to select the corresponding link or "category menu item" lying to the left of the main menu. For example, by selecting the "Setup" category menu item 154, the user calls up the first-level "Setup" configuration category screen 142.

In many cases, the user can navigate to a second-level category screen as well. Thus, in FIG. 5, by selecting the "Cable" item 170 on the first-level "Setup" configuration category screen 142, the user calls up a second-level configuration category screen (not shown) listing four types of cable input formats available for the set (Standard, HRC, IRC, and Auto; here the middle choices are for formats where the channel carriers are harmonically or incrementally related). Similarly, the user calls up a second-level screen with secondary audio program (SAP) options by selecting the MTS/SAP stereo item 172 (these options enable the user to listen to a secondary audio track, such as news or weather, while viewing an unrelated media program) or a second-level screen with parental control options by selecting the parental control menu item 174 (e.g., where the user can set the parental password and the least restrictive movie rating level at which the lock takes effect).

A significant advantage of the above described multi-leveled arrangement of input screens is that only a limited amount of information is presented or requested on any one screen so as not to overwhelm the user while, simultaneously, the depth of linked screens allows full capture of the desired user information in one session. Also, where the need for a piece of data is contingent on an earlier piece of data (for example, the specific minutes of nonuse needed before power-off occurs is contingent on the user first selecting the power-off feature), this linked structure saves the user the trouble of reviewing branches that represent unnecessary information.

Figure 4:
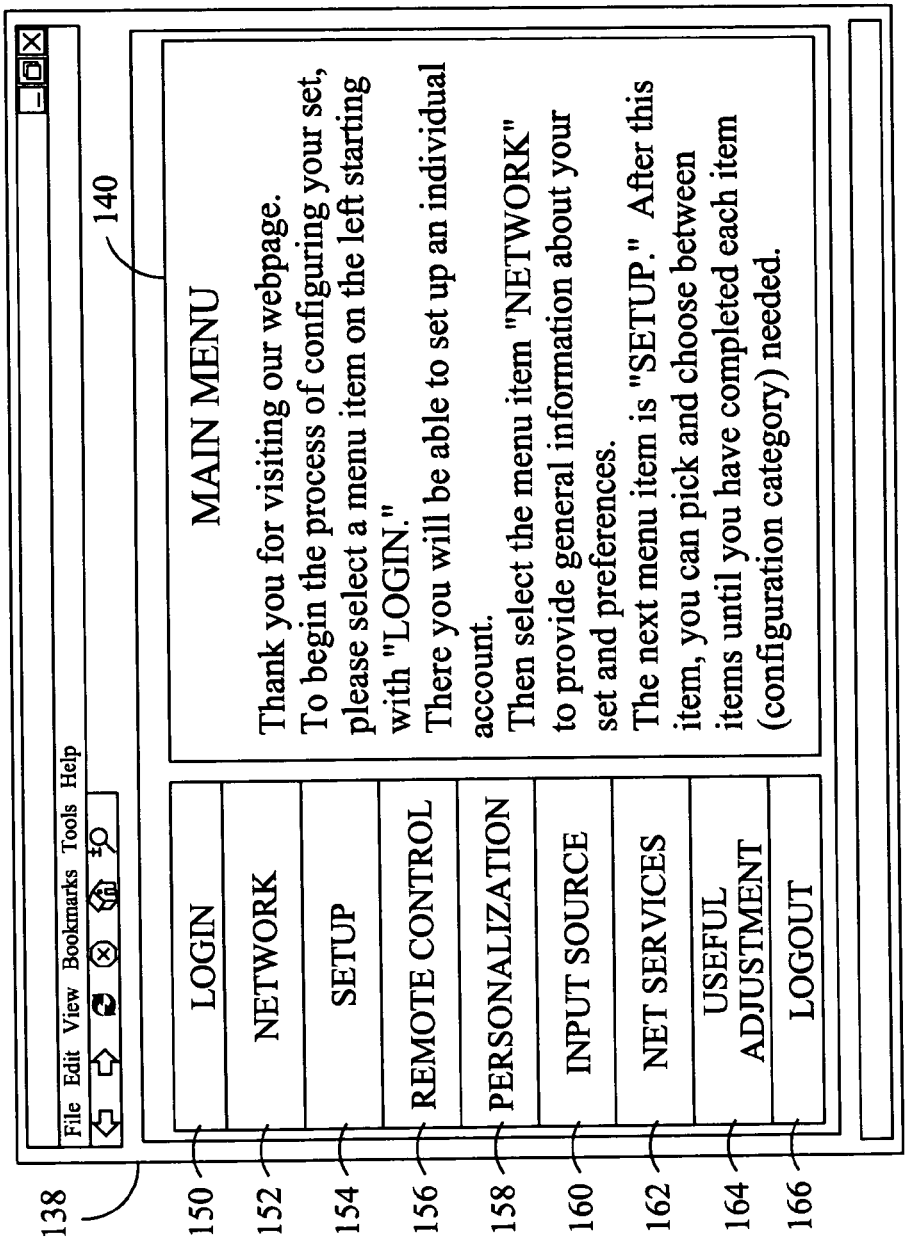
FIG. 4 is a screenshot of the output display depicted in FIG. 1 showing the main menu of a web page interface presented to the user in accordance with the methods of FIGS. 2 and 3.
Figure 5:
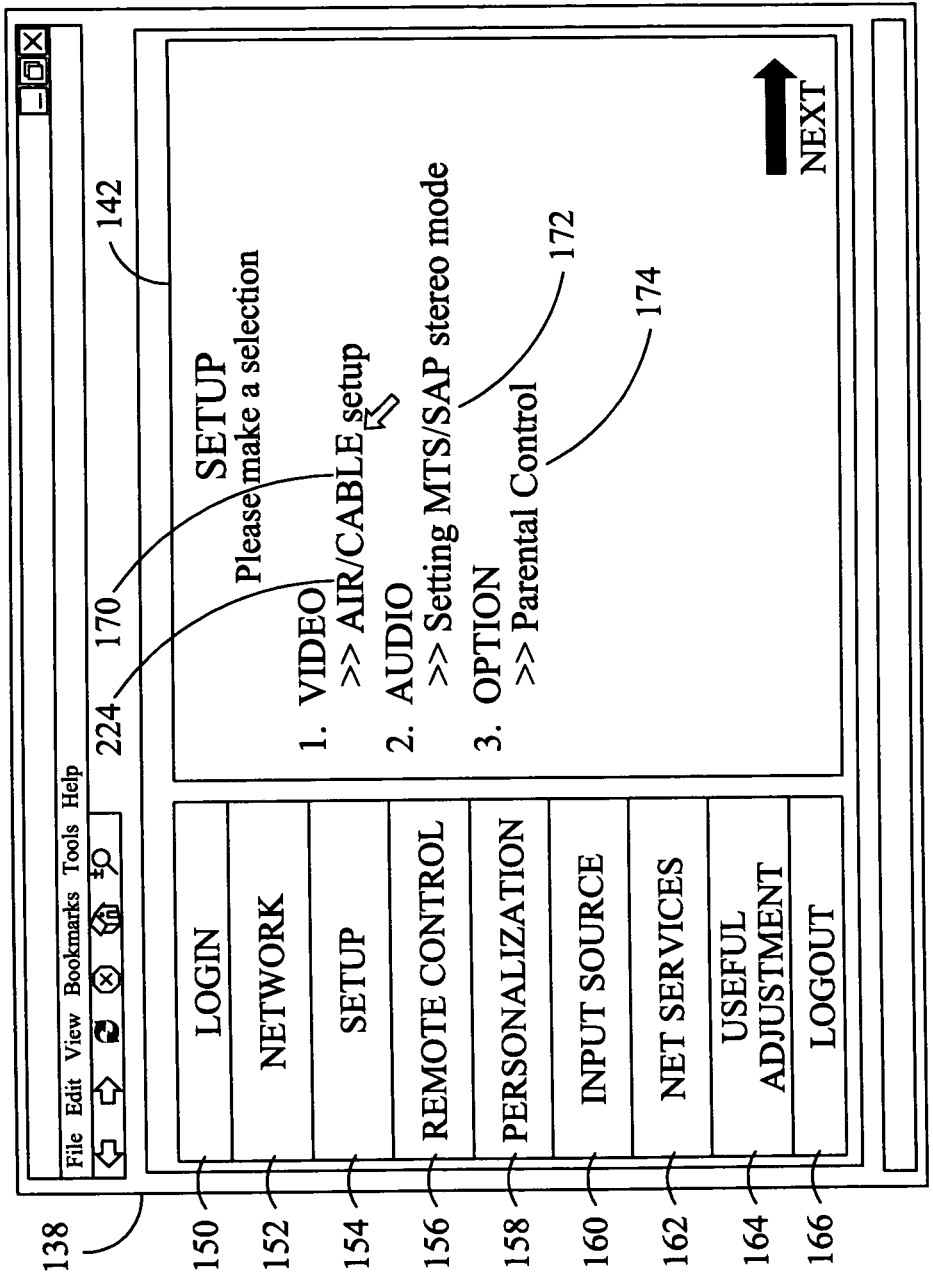
FIG. 5 is a screenshot of the output display of FIG. 1 where the menu item for the "Setup" configuration category has been selected, such as from the main menu of FIG. 4.
Figure 6:
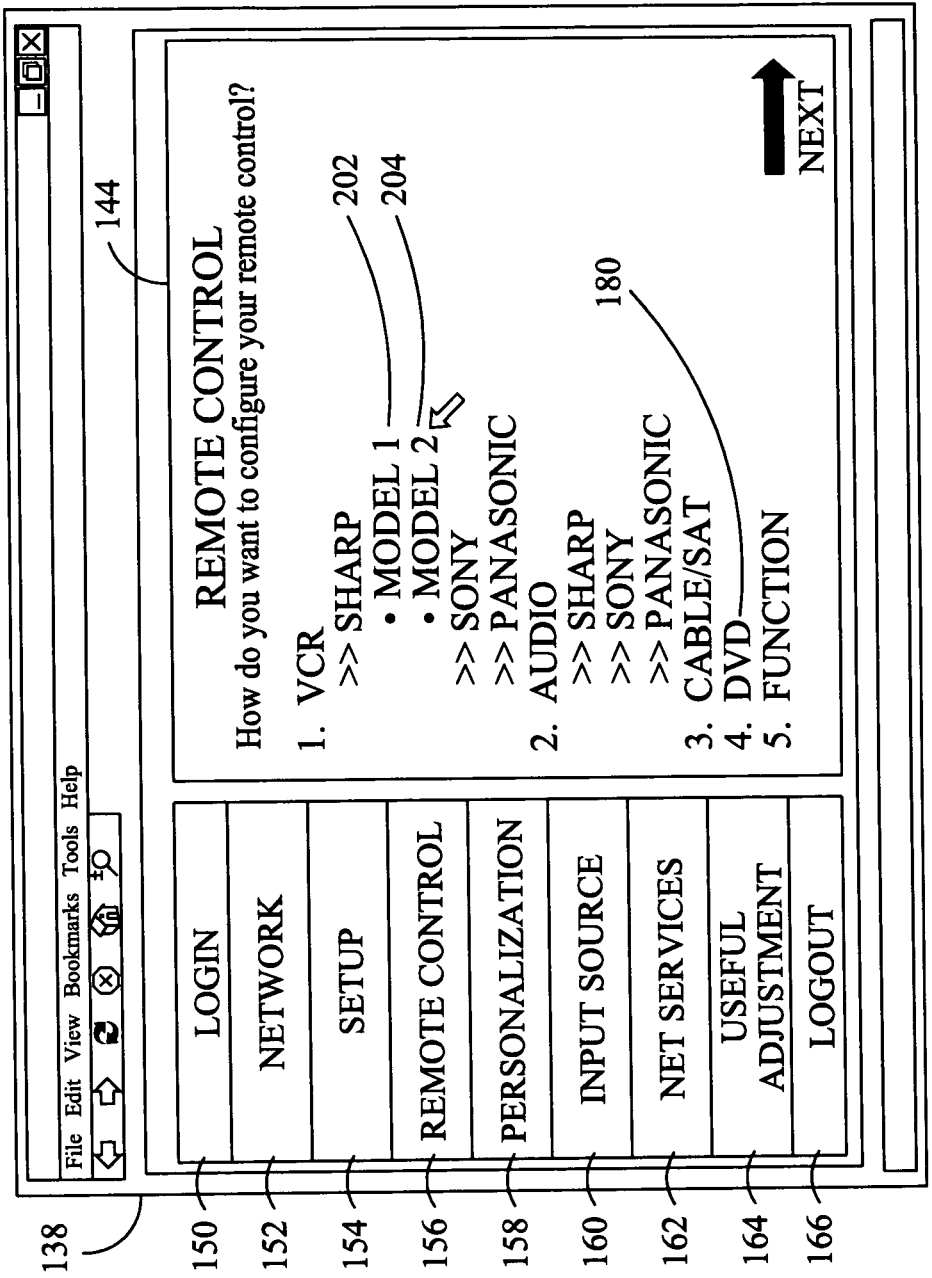
FIG. 6 is a screenshot of the output display of FIG. 1 where the menu item for the "Remote Control" configuration category has been selected, such as from the main menu of FIG. 4.

Step 176 in FIG. 3 involves presenting on the main menu screen a plurality of category menu items each being selectable for navigating to a first-level one of a corresponding configuration category screen. Referring to FIG. 4, the first three of these selectable menu items include: 1) a "Login" item 150 for calling up the screen (not shown) where the user establishes an account, provides a password, and provides personal identifying information, such as name and location (or zip code); 2) a "Network" item 152 to call the screen (not shown) that identifies the features of the user's local network, such as the particular model of the user's receiver 50 and any firewall in place; and 3) a "Setup" item 154 to call the screen 144 (FIG. 5) for entering basic video, audio, and setup options.

Figure 7:
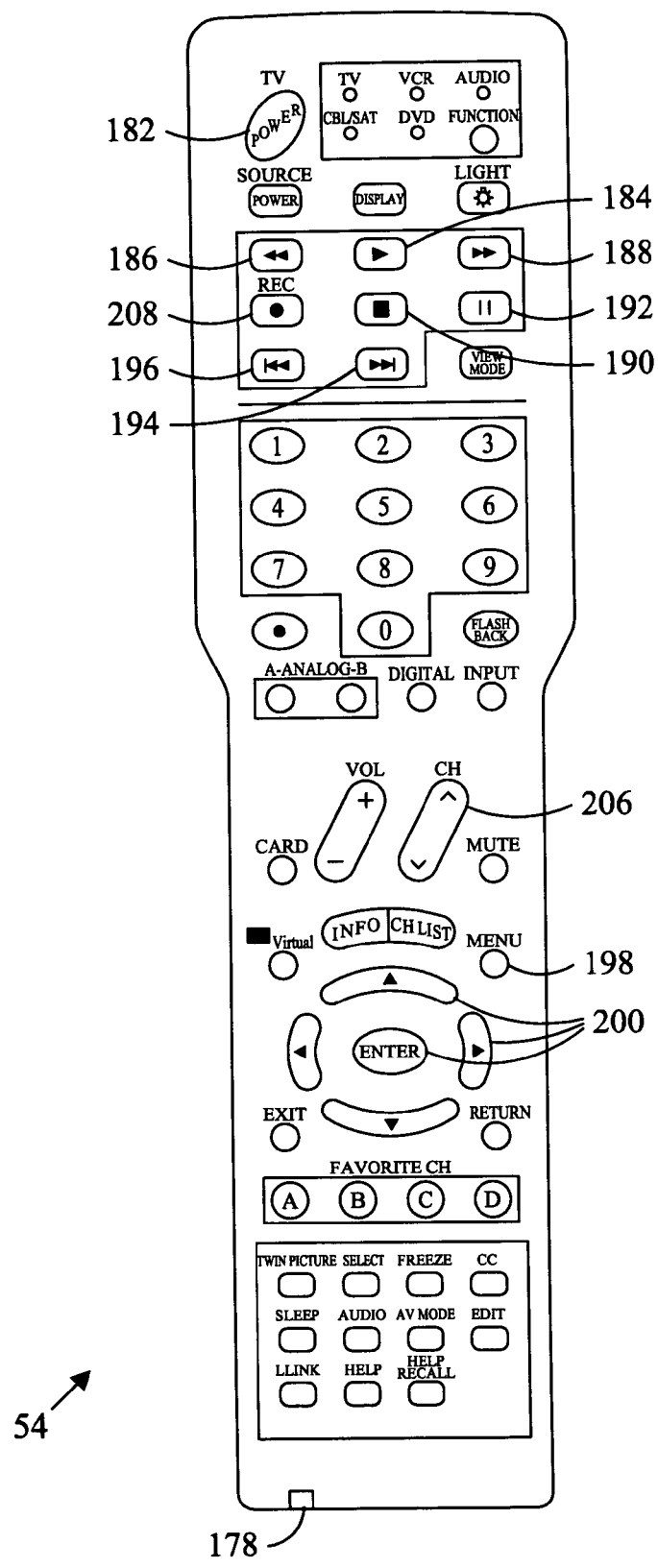
FIG. 7 is a plan view of a handheld remote control adapted to be configured from information taken from the configuration category screen of FIG. 6.

The user can decide to pick and choose between the next five menu items depending on whether the user has preference information they wish to submit under the corresponding category. This selection is facilitated by the prominent layout of the menu items on the main menu screen as provided for in step 176. These optional items include a "Remote Control" menu item 156 for calling up screen 146 (FIG. 6) to identify the particular peripherals for which the user would like to configure the remote. For example, based on the setup shown in FIG. 1, the user wishes to use the handheld remote 54 to control (in addition to the media receiver 50) a videocassette (VCR) player 90 and a digital videodisc (DVD) player 92. The model types of these devices are thus selected on the Remote Control screen 144. Although normally a handheld remote only has an output and no inputs, the handheld remote 54 has preferably been adapted to include an input port 178, as shown in FIG. 7. This input port is mateably engageable with a docking platform (not shown) on the receiver so that when the receiver is automatically configured, as further described below, the handheld remote is configured as well. This transforms the handheld remote into a "universal" device. For example, selecting the DVD entry 180 (FIG. 6), later enables control of the DVD device using the power 182, playback 184, backward 186, forward 188, stop 190, pause 192, next chapter 194, last chapter 196, menu 198, and navigational 200 keys of the handheld remote. Similarly, selecting one of the VCR entries 202 or 204 later enables also the channel select 206 and record 208 keys while dropping the menu 198 and navigational 200 keys.

Referring again to FIG. 4, the next four optional menu items include: 1) a "Personalization" item 158 for calling up the screen (not shown) to enter the user's favorite channels, sleep mode settings, and other personal preferences; 2) an "Input Source" item 160 to call a screen 146 (FIG. 8) for specifying which devices connect to which inputs 76, 78, and 80 of the receiver; 3) a "Net Services" item 162 to call a screen (not shown) for specifying any external network services, such as HBO or ESPN, that the user desires to subscribe to and any related options such as one-button service; and 4) a "Useful Adjustments" item 164 to call a screen (not shown) to preset various picture and audio attributes of the receiver such as backlight, contrast, brightness, color, tint, sharpness, view mode (to set the media frame to screen size ratio), auto sync, fine sync settings, treble, bass, balance, or volume. The final menu item 166 is for "Logout."

Referring to FIG. 3, step 210 of the detailed data collection procedure 134 involves presenting a plurality of category menu items on each of the levels of the configuration category screens, each menu item being selectable for returning to a first-level one of a corresponding configuration category screen. Hence, whether the user is entering data at a first-level configuration category screen, such as screens 142, 144, and 146 in FIGS. 5, 6, and 8, respectively, or whether, instead, the user has navigated from these screens to a second-level screen, the category menu items 150, 152, 154, 156, 158, 160, 162, 164, and 166 are always displayed. Thus these menu items serve as familiar landmarks and enable the user to conveniently return immediately, regardless of the current level they are at, to any first-level configuration category screen they desire.

Referring again to the exemplary method 120 shown in FIG. 2, this concludes the detailed description of step 132 as described with reference to FIGS. 3-8. This also concludes the description of the first main stage of the exemplary method, which involved collecting personal data from each user. The following description covers the other two main stages of the method, which involve 1) generating a personalized script based on such data; and 2) activating this script in order to configure the set including by automatically making personalized setup selections from preexisting setup alternatives supported by the particular set.

The next step 220 in the exemplary method 120 is providing a script generator on the computing device. This is depicted in FIG. 1, which shows the computing device 40 including a script generator 48. This step is followed by step 222 which involves automatically generating a personalized script for each set based on the personal setup information in the individual account of the corresponding user. It will be recognized, here, that the preexisting (i.e., existing before script creation) setup alternatives supported by the set are necessarily limited in number (just as the user manual of the set describing these alternatives has a limited number of pages). Thus it is possible to code particular script sequences in advance, each for implementing a corresponding one of the alternatives, and then, based on an evaluation of the personal setup information entered by a particular user, to automatically build or assemble a personalized script for that user formed of those script sequences that are in accord with that user's personal setup information. These evaluating and assembling operations are automatically performed by the script generator. The script generator can, if desired, be implemented in software, such implementation being well within the programming skill of those of ordinary skill in the art. A detailed description of script operation is provided below.

The individual code sequences which the script generator 48 uses are typically collected in a library stored in the central database 46. As new sets or peripherals are introduced and new setup alternatives become available, this library, being contained in the centralized database, can be conveniently expanded or updated as needed. The library can also be updated, if desired, to provide enhanced features on existing sets, although the present system and method is primarily directed to enabling the user to make full and effective use of their set's current features.

As described, the script generated is based on the user's personal setup information and, hence, is personalized for that particular user. As was noted in connection with step 128, the user's personal setup information includes personal "identifying" and personal "preference" information. In some cases, the user may inadvertently fail to enter essential "preference" information necessary for proper configuration and operation of the set. For example, referring to the "Setup" screen 142 in FIG. 5, occasionally a user may fail to select either item 224 or item 170 indicating whether the "Video" signal will be derived from an "air" antenna or "cable" link, respectively. Or the user may select the "parental control" option 174, but then fail, on the succeeding category screen (not shown), to enter the least restrictive movie rating level that triggers the lock (i.e., PG, PG-13, R, NC-17, or X in the U.S.).

To address these types of situations, as indicated by step 226 of the exemplary method, if the personal setup information submitted by the user is significantly incomplete, then preferably the script is also generated based on "presumed" preference information in order to fill in the critical gaps. In the above examples, for example, it is presumed that the user would select the "cable" link (or, even more specifically, the digital cable link) and the PG rating as the triggering level. The first "presumed" selection, though it may lead to the inclusion of extra channels, ensures that all the potential channels (e.g., channels 1-135 for digital cable) are available to the user; while the second "presumed" selection, though it may be regarded as overly restrictive for older children, ensures that the lock will take effect at a level appropriate for even the youngest child. In more arbitrary cases, the presumed selection can be chosen based on that most popular with other users whose personal characteristics most closely match the present user's. This, in turn, can be gauged by shared "favorite channels" or demographics (gender, age, etc.) or presumed socioeconomic status (e.g., as evaluated using census data and the user's zip code). It will be noted that such data for other users is conveniently accessible due to the storage of the individual accounts in the centralized database 46.

The above completes the description of the second main stage of the exemplary method 120, which involved generating a personalized script based on each user's personal data. The third and final stage, which will now be described below, relates to activating this script. Referring to steps 228 and 230, by activating the script, the corresponding set is configured based on the personalized setup information submitted by the corresponding user. This configuration includes automatically making personalized setup selections from preexisting setup alternatives supported by the set. As the last statement indicates, the "setup" selections made by the script include "alternatives" that "preexist" the script and that are "supported by the set" (i.e., alternatives that the set supported before the script is even generated). The term "alternatives" refers to two or more setup options or selections in mutually exclusive relationship to each other, that is, selecting one of these options necessarily precludes selecting the other. Thus, on the "Setup" screen 142 (FIG. 5), the user can either select the "air" item 224 or the "cable item" 170, but not both together, or can enable the parental control item 174 or disable it (by not actively selecting it), but not both together. In configuring the set, although the script automates making these selections, the underlying alternatives existed before the script. Selection between these alternatives could, for example, have been made instead, though with greater difficulty, manually by the user. Thus the script enables the user to take fuller and more effective advantage of the various features or "alternatives" normally offered by the set.

Figure 9:
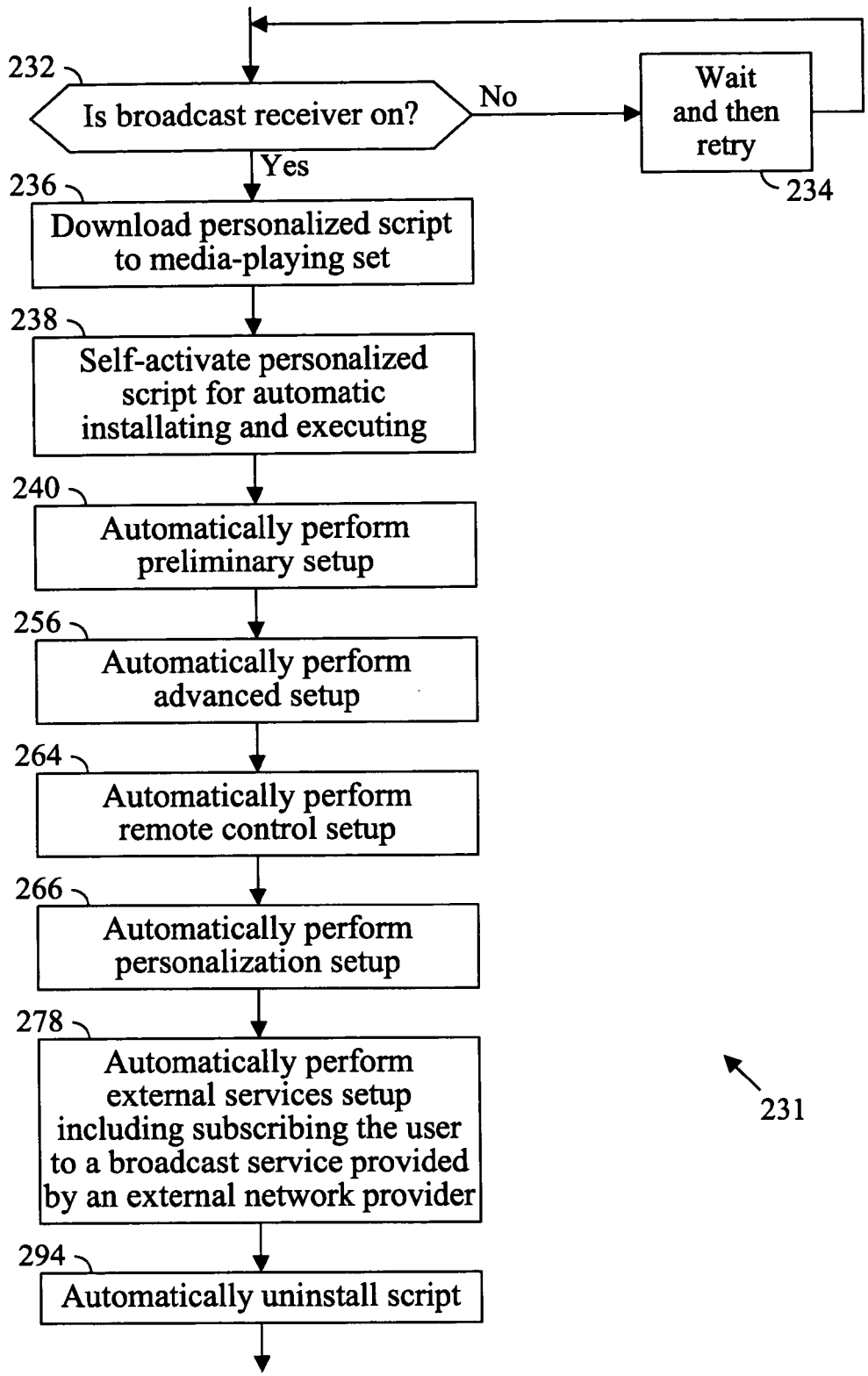
FIG. 9 shows an exemplary sequence of operations performed by the personalized script while configuring the set in accordance with the method of FIG. 2.

An exemplary sequence of operations 231 that are performed by the script upon being activated are depicted in FIG. 9. In FIG. 9, after the first two or three preparatory steps, each step corresponds to particular task or code sequence automatically executed by the script. Certain of these tasks are depicted in further detail in FIGS. 10-12.

The first step 232 of FIG. 9 involves determining if the broadcast receiver is on. In FIG. 1, for example, the querying module 42 of the remote computing device 40 sends a query to the local computer 58 requesting this information. The computer verifies the power state of the receiver 50 and returns this status information to the remote computing device. Referring to step 234, if the receiver isn't on, after a suitable interval of time during which a reminder may be sent to the user to turn the set on, the query process is repeated. Referring to step 236, if the receiver is on, the personalized script is downloaded so that it can be placed into local memory 66 and executed by the local CPU 64 (in an alternative configuration, as noted above, the local computer and its elements may be integrated with the receiver 50).

As indicated by step 238, after being downloaded, the personalized script is self-activating or -executing. That is, it contains a code sequence serving as an internal trigger for initiating installation and execution of the script. Once initiated, the script automatically continues to execute, that is, it proceeds to carry out the tasks embodied in its code, until its execution cycle is complete.

As may be recognized from the foregoing description, another desirable characteristic of the script is that it is closed-ended or fully "self-contained." Once the script is downloaded, when and how the script will perform its setup tasks is limited to a fixed range. This is so even if predetermined delays have been built into the script, for example, if self-activation occurs some predetermined time after download or if, at select times, pauses are inserted in the script to afford the user a better opportunity to review on-screen instructions. If the user didn't enter all the information needed to complete an essential setup task before the script was built, the script preferably incorporates presumed data to fill in the gaps (see step 226 of FIG. 2). Neither is the user required to do anything to start the self-activating script. Furthermore, the script preferably proceeds to execute until it has completed all of its assigned tasks independently of intervention by the user or other contingent events. For example, the script may ask the user to confirm that they have had sufficient opportunity to review an on-screen text or tutorial, but if the information is not forthcoming after some appropriate and fixed interval, the script preferably proceeds to the next task automatically rather than waiting, perhaps indefinitely, for a user response.

Referring again to FIG. 9, after self-activating, the script automatically performs preliminary setup of the set as indicated by step 240. An exemplary listing 241 of the tasks performed during preliminary setup is shown in FIG. 10. Broadly speaking, these tasks are preliminary in the sense of forming the foundation for the more advanced functions that the script later implements. In general, the tasks are based on the personal information collected from the user on the "Network," "Setup," and "Input Source" screens (see the corresponding menu items listed in FIG. 5). They include task item 242, configuring the set for the language indicated by the user (e.g., English, French, or Spanish); item 244, configuring the clock (preferably to synchronize it with a national standard based on the location indicated by the user's zip code); item 246, specifying a mapping of allowable channels (e.g., based on scanning through the channels and finding out which work, such scanning being limited to those channels available for the external source picked, such as channels 1-69 for VHF/UHF air broadcast); item 248, setting the power settings; item 250, setting the closed captioning setting (such option complying with the law); and item 252, configuring the basic video and audio reception characteristics (refer to the previous description of these items given in reference to the Setup screen 142 of FIG. 5).

Figure 8:
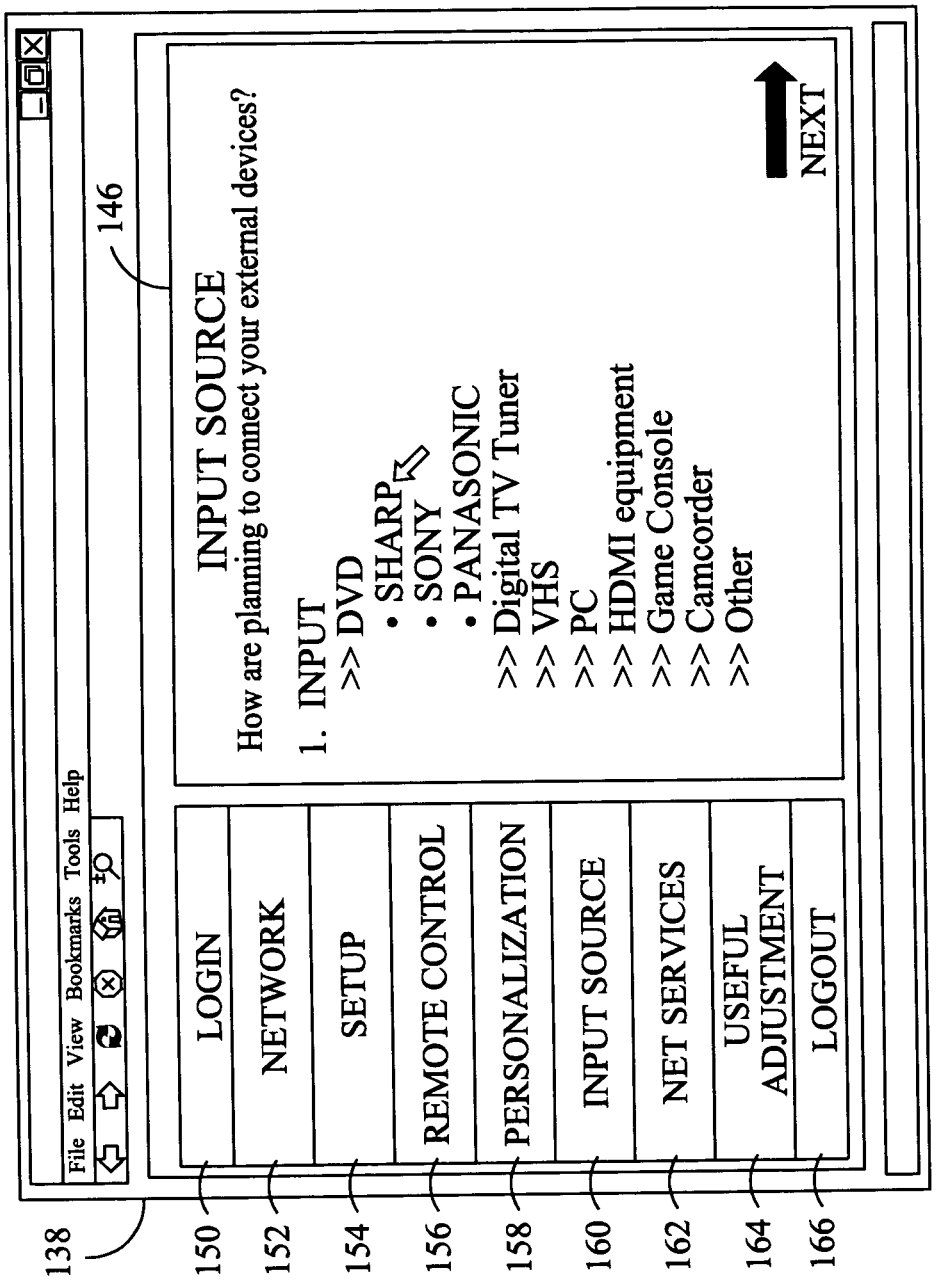
FIG. 8 is a screenshot of the output display of FIG. 1 where the menu item for the "Input Source" configuration category has been selected, such as from the main menu of FIG. 4.

During the earlier information collection stage, the user was asked to specify what type of source device was being connected to each media input of the broadcast receiver. For example, FIG. 8 shows the "Input Source" screen that asked for this information for peripheral input 1. The system of FIG. 1 shows a broadcast receiver 50 having three different peripheral inputs, namely I1 (item 76), I2 (item 78), and I3 (item 80), so the user was presented, in this case, with three different "Input Source" screens (the user previously specified the number of peripheral inputs by specifying the receiver's model type under the "Network" screen). As indicated by step 254 of FIG. 10, as part of configuring the basic video characteristics, the personalized script configures the peripheral inputs of the receiver, each for compatibility with the identified source type. In the system shown in FIG. 1, for example, the script configures input 1 (I1) for connection to the user-indicated model of videocassette player/recorder 90 (e.g., enabling component or composite video, as appropriate). Likewise, the script configures input 2 (I2) for connection to a digital videodisc player 92. Finally, depending on whether the user decides to connect the audio player/recorder 74 or the game console 96 to input 3 (I3), the script configures that input accordingly (e.g., for left/right audio jack input or S-video cable input).

Referring now to step 256 of FIG. 9, after performing preliminary setup, the script then automatically performs advanced setup. An exemplary listing 257 of the tasks performed during advanced setup are shown in FIG. 11. Step 258 involves setting the parental control option (password and rating level for triggering the lock). Step 260 involves configuring the digital antenna and performing digital setup (where the media receiver 50, for example, is a digital television). Step 262 involves presenting tutorials visually demonstrating how to connect the media source devices to the media inputs of the set. Such tutorials can be in the form of graphic images, slide presentations, or brief movie clips. As noted above, the user may be prompted for an entry to confirm they have finished reviewing the tutorial, though the script preferably proceeds automatically with the next task if the user doesn't respond within a reasonable time. The media input involved can include the main input 74 for connecting to an external media source. For example, the tutorial can show or demonstrate which output connectors connect to which input connectors for an indicated type of receiver, VCR, cable converter, and signal splitter, so that TV programs or VCR tapes are viewable without concern about the VCR's TV/VCR switch and while enjoying stereo VCR playback. The media input involved can include an auxiliary input, such as item 80, for connecting to a peripheral device. For example, the tutorial can show or demonstrate the jack-to-plug connections between the receiver and a DVD player depending on whether component or composite cable is used.

In accordance with step 264 of FIG. 9, the script automatically performs the task of remote control setup. Further details about remote control setup were described in connection with FIGS. 6 and 7. When this task is complete, user-indicated ones of the peripheral devices (e.g., devices 90 and 92 in FIG. 1) are directly controllable by the handheld remote 54 and, in particular, each indicated device is controllable by a corresponding set of keys on the remote that are appropriate for controlling that particular type of device.

In accordance with step 266 of FIG. 9, the script automatically performs the task of performing personalization setup. A detailed listing 267 of the tasks performed during personalization setup are shown in FIG. 12. Broadly stated, the particular setup items that are configured during this task enable the particular user to further "personalize" the set and are optional rather than essential to the set's proper operation. In general, this task is performed based on the personal information collected from the user on the "Personalization" and "Useful Adjustment" screens (see the corresponding menu items listed in FIG. 5).

Referring to step 268 of FIG. 12, the personalization tasks include setting the sleep mode, Dolby, and auto sync (for digital reception) settings. Referring to step 270, these tasks can further include presetting inherent performance attributes of the set each to a particular value selected from a range of possible values. This, in turn, as further set forth in step 272, can involve presetting the favorite channels as selected from the full range of possible channels to those indicated by the user so that, for example, the user can select each favorite channel with just one key press on the handheld remote. Or it can involve, as further set forth in step 274, presetting a picture attribute of the set, such as backlight, contrast, brightness, color, tint, sharpness, view mode, and fine sync (that is, individually setting one or more of horizontal (H) position, vertical (V) position, clock, and phase for digital reception). Or it can involve, as further set forth in step 276, presetting an audio attribute of the set, such as treble, bass, balance, or volume.

Referring to step 278 of FIG. 9, after performing personalization setup, the script next performs external services setup including subscribing the user to a broadcast service or services provided by an external network provider or providers. For example, during this task, the script might instruct the personal computer 58 (FIG. 1) to dial up the subscription website of an external service provider, such as HBO or ESPN, and to automatically submit the user's personal identifying information to this website as needed to subscribe the user to the indicated service. The user's preferences as to which services, if any, to subscribe to are based on the personal information collected from the user on the "Net Services" screen (see the corresponding menu item listed in FIG. 5).

Figure 13:
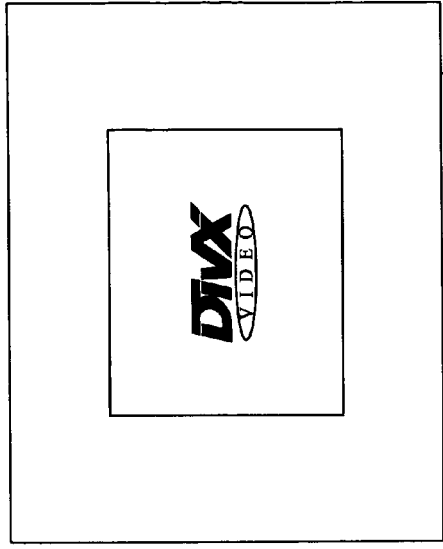
FIG. 13 shows a screenshot of the output display of FIG. 1 and, in particular, shows the visual notification provided to the user while the personalized script is performing the preliminary setup operation shown in FIGS. 9 AND 10.
Figure 14:
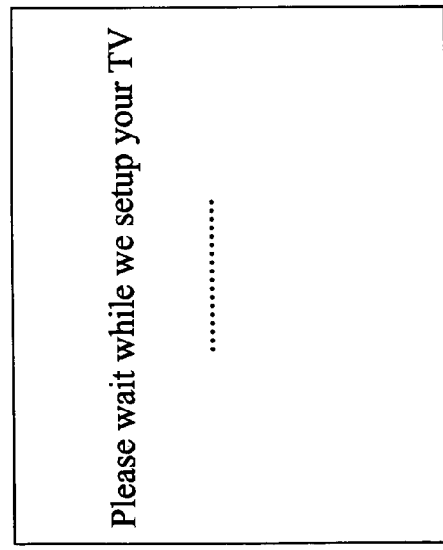
FIG. 14 shows a screenshot of the output display of FIG. 1 and, in particular, shows the visual notification provided when the script is in the early stages of performing the advanced setup operation shown in FIGS. 9 and 11.
Figure 15:
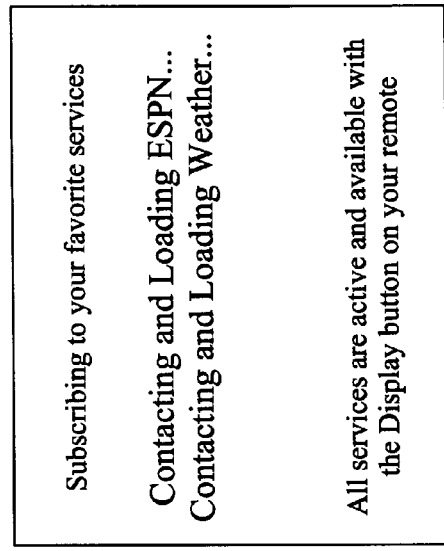
FIG. 15 is similar to FIG. 14 except for showing the visual notification provided in a later stage of the advanced setup operation and, in particular, shows the lead frame announcing the video format to be used in the video tutorials directly following.
Figure 16:
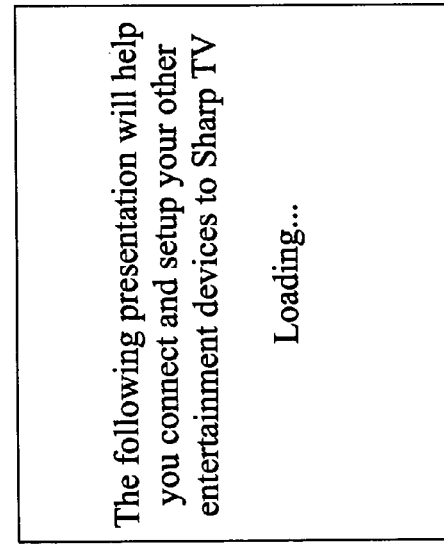
FIG. 16 shows a screenshot of the output display of FIG. 1 and, in particular, shows the visual notification provided to the user while the personalized script is performing the external services setup operation shown in FIG. 9.

Referring now to step 280 of FIG. 2, as the set is being automatically configured by the script, preferably the user is kept updated regarding the progress being made by some form of visual notification. For example, FIG. 13 shows the visual notification screen 282 that appears on the output display 103 while the script is executing the code sequence or performing the task of step 240 of FIG. 9, that is, while the script is automatically performing preliminary setup. When, in accordance with step 256 of FIG. 9, the script begins to automatically perform advanced setup, at first the visual notification screen 284 of FIG. 14 appears. This is shortly followed by the visual notification screen 286 of FIG. 15, which is the lead frame announcing the video format that is used in the video tutorials directly following. When, in accordance with step 278 of FIG. 9, the script is automatically performing external services setup, the visual notification screen 288 of FIG. 16 appears. In this manner, the user is kept informed on the script's progress and, in particular, is not left guessing as to whether the automatic process is working properly.

Referring to step 290 of FIG. 2, when the script is finished configuring the set, preferably the script loads a data security component 292 (FIG. 1) into the local computer 58 that remotely connects the set in order to clear from this computer any personal setup information entered by the user. Thus, if this computer is later used by a different user as a standalone unit or is later connected to a different remote network, the original user's personal identifying information, such as name, age, gender, and zip code, is protected against unauthorized browsing. It will be recognized, then, that the present system and method provides a threefold system of protection for the user's personal data: first, when the data is stored remotely in a password-protected individual account on the central database 46; second, when the data is originally transferred by secure protocol from the set to the remote computing device; and third, when unneeded remnants of data are cleared from the local connecting computer after the script has completed configuration of the set. The data security component is itself uninstalled together with the script and hence is indicated in dashed-line profile in FIG. 1.

Referring also to step 294 of FIG. 9, the personalized script preferably includes a code sequence that then automatically uninstalls the script. This frees up local computing resources and further protects the security and integrity of the user's local network. In particular, this eliminates any possibility that the user will later be taken by surprise by some part of the script restarting. It will be recognized, here, that this internally triggered uninstall process is in keeping with the above described "self-contained" character of the script.

An exemplary system and method for providing personalized assistance to users with setup of their respective media-playing set has now been described which, in particular, automatically makes personalized setup selections from a plurality of preexisting setup alternatives supported by the corresponding set. It will be evident to those of ordinary skill in the art that at least certain substitutions and combinations other than those set forth above are possible and that the particular structures, operations, and orderings of tasks described may be subject to alteration without, in fact, significantly deviating from the core teachings and essential elements of the present invention.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A system for providing personalized assistance to users with setup of their respective media-playing sets comprising:
(a) a computing device remote from each set hosting a web page interface enabling each user to create an individual account and to provide user input comprising personal setup information for entry into said individual account, said setup information including user selections of specific features said user prefers to enable on said media playing set;

(b) said computing device including a script generator to generate a personalized script for each set of a corresponding user, said script generator, without further user input and using said specific features selected by only the corresponding user, automatically constructing a composite code sequence from selected ones of a plurality of preexisting code sequences stored in a location accessible to said script generator, each preexisting code sequence associated with a respective feature selectively enabled by a said medial playing set; and (c) said computing device configuring the corresponding set using said composite code sequence.

2. The system of claim 1 wherein each personalized script includes a code sequence for self-activating said script in response to said set being on and said script being downloaded from said computing device.

3. The system of claim 1 wherein said web page interface uses a secure protocol for enabling each user to securely submit said personal setup information.

4. The system of claim 1 wherein each personalized script includes a code sequence for automatically uninstalling said script upon completing said personalized setup selections.

5. The system of claim 1 wherein each set includes an input for selectively receiving media signals from a plurality of source types and said personalized setup selections include a selection for configuring said input for compatibility with a particular one of said source types.

6. The system of claim 1 wherein each set includes a media broadcast receiver having a control input and further includes a control device for sending control signals to said control input, said control device being manually manipulable for making personalized setup selections from said setup alternatives, said setup alternatives being supported by said receiver.

7. The system of claim 6 wherein said control device is a handheld remote control unit.

8. The system of claim 6 wherein said control device is a personal computer.

9. A method for providing personalized assistance to users with setup of their respective media-playing sets comprising:

(a) providing a web page interface on a computing device remote from each set and prompting each user via said web interface to create an individual account and to provide user input comprising personal setup information for entry into said individual account, said setup information including user selections of specific features said user prefers to enable on said media playing set;

(b) providing a script generator on said computing device and generating with said script generator a personalized script for each set of a corresponding user, said script generator, without further user input and using said specific features selected by only the corresponding user, automatically constructing a composite code sequence from selected ones of a plurality of preexisting code sequences stored in a location accessible to said script generator, each preexisting code sequence associated with a respective feature selectively enabled by a said medial playing set; and (c) by activating each personalized script, configuring the corresponding set using said composite code sequence.

10. The method of claim 9 further including determining if said personal setup information submitted is incomplete and, if so, generating the corresponding personalized script based, at least in part, on presumed preference information.

11. The method of claim 9 wherein said step of automatically making personalized setup selections includes configuring a media input on each set.

12. The method of claim 11 further including presenting on each set a tutorial visually demonstrating how to connect a certain type of source device to said media input.

13. The method of claim 9 wherein said set comprises a local network including a media broadcast receiver and a plurality of different media source devices and including the step of automatically configuring said receiver to receive respective media signals from said different media source devices.

14. The method of claim 9 wherein said step of prompting each user to submit personal setup information is performed in a single session.

15. The method of claim 9 further including configuring the corresponding set by subscribing the corresponding user to at least one broadcast service provided by an external network provider.

16. The method of claim 9 wherein said step of automatically making personalized setup selections includes automatically configuring video reception characteristics.

17. The method of claim 9 wherein said step of automatically making personalized setup selections includes presetting inherent performance attributes of each set to a particular value selected from a range of possible values based on the personal setup information submitted by the corresponding user.

18. The method of claim 9 wherein said step of automatically making personalized setup selections includes specifying a mapping of allowable channels for each set.

19. The method of claim 9 wherein said step of prompting each user for personal setup information includes prompting for personal identifying information and for personal preference information.

20. The method of claim 9 wherein said step of prompting each user for personal setup information includes presenting a main menu screen and further levels of configuration category screens branching off said main menu screen.

21. The method of claim 20 further including presenting on said main menu screen a plurality of category menu items each selectable for branching off to a first level one of a corresponding configuration category screen for selecting personal setup information therefrom.

22. The method of claim 21 further including presenting said plurality of category menu items on each of said levels of said configuration category screens, each category menu item being selectable for returning to a first level one of a corresponding configuration category screen.

* * * * *